United States Patent [19]
Tapp

[11] Patent Number: 5,657,076
[45] Date of Patent: Aug. 12, 1997

[54] SECURITY AND SURVEILLANCE SYSTEM

[76] Inventor: Hollis M. Tapp, 4220 Crestover Dr., Mesquite, Tex. 75150

[21] Appl. No.: 404,114

[22] Filed: Mar. 14, 1995

Related U.S. Application Data

[63] Continuation-in-part of Ser. No. 3,420, Jan. 12, 1993, Pat. No. 5,398,057.

[51] Int. Cl.⁶ .................................................... H04N 7/18
[52] U.S. Cl. ............................................ 348/154; 348/565
[58] Field of Search .................................. 348/154, 565, 348/153, 155, 156, 159, 143; 340/541, 692; H04N 7/18

[56] References Cited

U.S. PATENT DOCUMENTS

| | | | |
|---|---|---|---|
| 3,641,266 | 2/1972 | Stults et al. | 178/6.8 |
| 4,166,273 | 8/1979 | Riley, Jr. et al. | 340/539 |
| 4,236,180 | 11/1980 | Cayzac | 358/105 |
| 4,401,976 | 8/1983 | Stadelmayr | 340/522 |
| 4,458,266 | 7/1984 | Mahoney | 358/105 |
| 4,511,886 | 4/1985 | Rodriguez | 340/534 |
| 4,589,081 | 5/1986 | Massa et al. | 364/554 |
| 4,814,869 | 3/1989 | Oliver, Jr. | 358/108 |
| 4,843,461 | 6/1989 | Tatsumi et al. | 358/108 |
| 4,857,912 | 8/1989 | Everett, Jr. et al. | 340/825.3 |
| 5,091,780 | 2/1992 | Pomerleau | 358/108 |
| 5,264,929 | 11/1993 | Yamaguchi | 358/108 |

*Primary Examiner*—Howard W. Britton
*Assistant Examiner*—Luanne Din
*Attorney, Agent, or Firm*—Baker & Botts, L.L.P.

[57] ABSTRACT

A security and surveillance system (10) uses a processor (40) to generate an infrared coded signal for performing a specific function. A detector (12) monitors a zone of surveillance (A) and generates an activation signal in response to the detection of an intruder in the zone. The activation signal triggers the processor (40) to generate an infrared coded signal to perform a specific function corresponding to the triggered zone of surveillance (A). In a specific application, a camera switcher (38) transmits an appropriate camera signal to a television monitor (36) and infrared coded signals generated by the processor (40) control and command the television monitor (36) to display the images from the video camera (20) in response to an intruder detection.

20 Claims, 3 Drawing Sheets

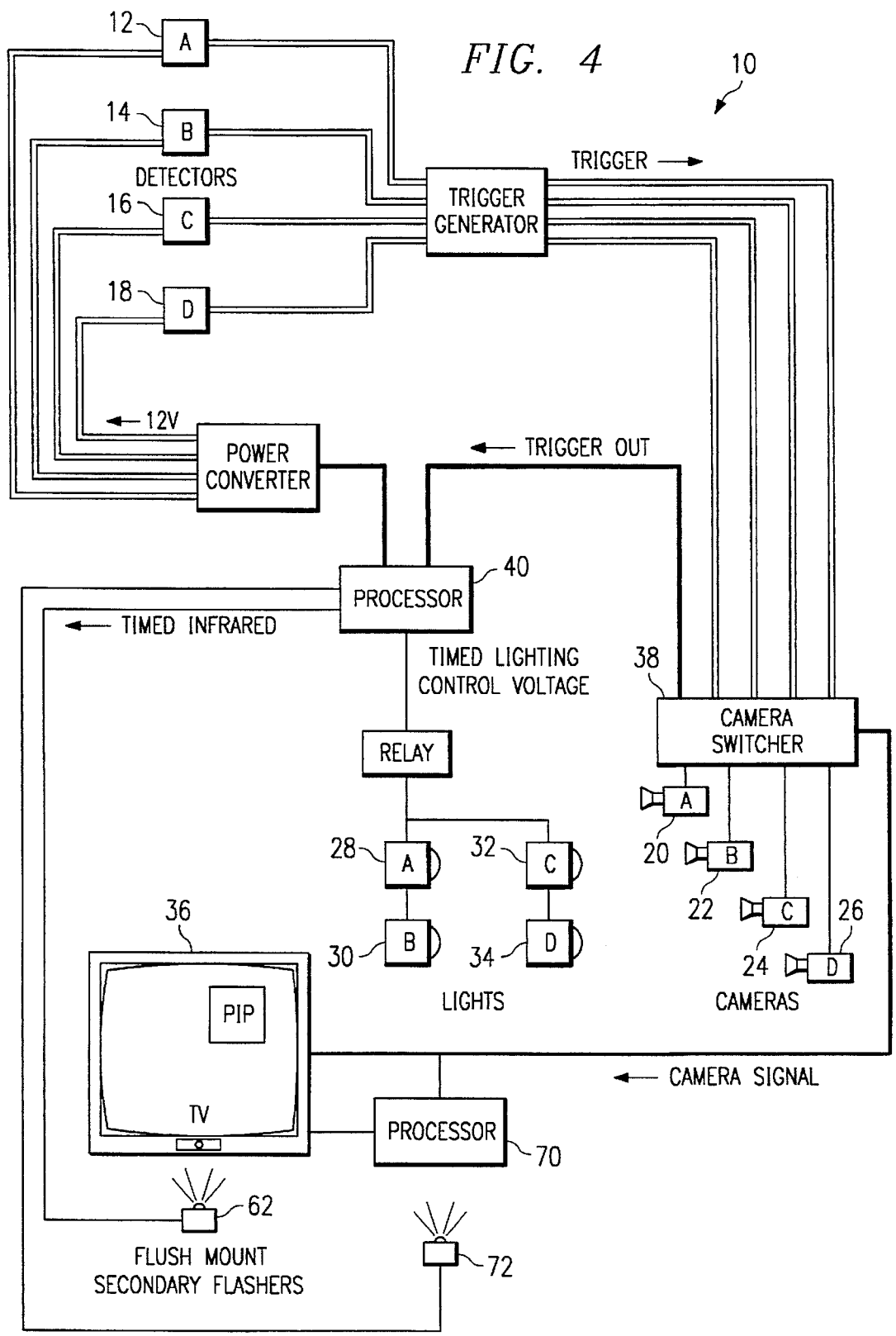

SECURITY AND SURVEILLANCE SYSTEM

This application is a continuation-in-part application of U.S. application Ser. No. 08/003,420, filed Jan. 12, 1993, and entitled "Security and Surveillance System", now U.S. Pat. No. 5,398,057, issued Mar. 14, 1995.

TECHNICAL FIELD OF THE INVENTION

This invention relates in general to intruder detection devices and more particularly to a security and surveillance system.

BACKGROUND OF THE INVENTION

Conventional security systems require expensive and bulky equipment to monitor a building or other desired areas for denying access to potential intruders. These systems are not practical for use in a residential home. Therefore, it is desirable to have a security and surveillance system that integrates with available home equipment such as a television to provide low cost and effective surveillance monitoring of the house and grounds.

From the foregoing it may be appreciated that a need has arisen for a security and surveillance system that automatically performs a specified function upon detecting the presence of an intruder. A need has also arisen for a security and surveillance system that automatically interrupts normal television viewing to display a zone of surveillance in the event of a monitored intrusion. Further, a need has arisen for a security and surveillance system that generates in infrared code to control a television monitor in response to a detected intrusion event.

SUMMARY OF THE INVENTION

In accordance with the present invention, a security and surveillance system is provided which substantially eliminates or reduces disadvantages and problems associated with conventional intrusion detection devices.

The present invention includes a detector for determining a presence in a zone of surveillance. Upon detection of an undesirable presence in the zone of surveillance, the detector generates an activation signal. In response to the activation signal, a processor generates an infrared code that performs a specific function corresponding to the activation signal. The present invention may also include a video camera for generating an image of the zone of surveillance and a television monitor coupled to the video camera. The processor controls the television monitor through the specific function corresponding to the generated infrared code in order to display an image of the zone of surveillance generated from the video camera.

The security and surveillance system of the present invention provides for various technical advantages. For example, one technical advantage is to provide a security and surveillance system that uses an infrared code to perform a specific function. Another technical advantage is to automatically interrupt normal television viewing in order to display a zone of surveillance upon the detection of an intrusion event. Other technical advantages are readily apparent to one skilled in the art from the following descriptions, figures, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 4 illustrates a block diagram of an alternative application for the security and surveillance system.

DETAILED DESCRIPTION OF THE INVENTION

Figure 1:
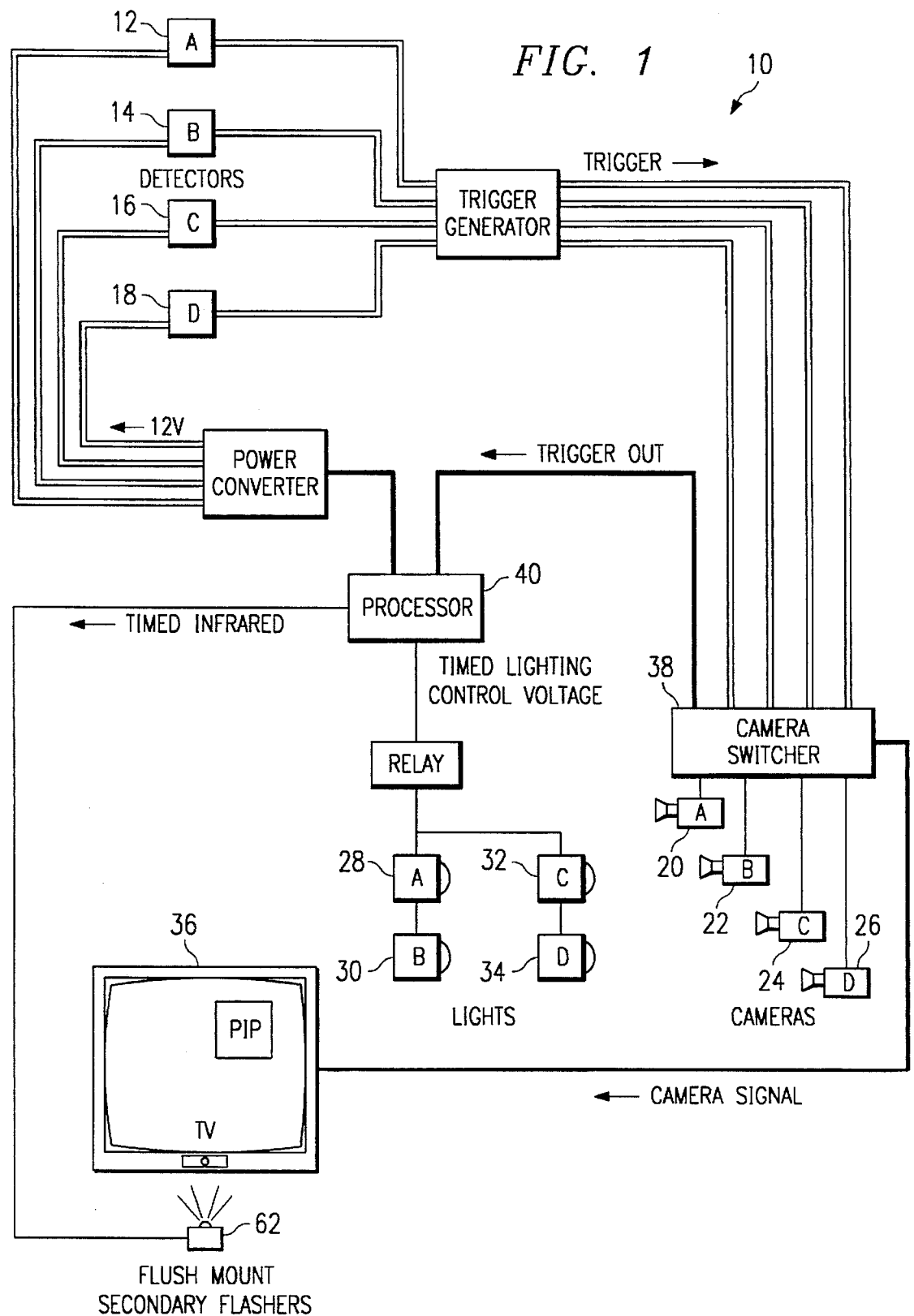
FIG. 1 illustrates a block diagram of a security and surveillance system.

FIG. 1 is a block diagram of a security and surveillance system 10. Security and surveillance system 10 includes a detector 12 monitoring a zone of surveillance. A. Other detectors 14, 16, and 18 may be used to monitor zones of surveillance B, C, and D, respectively. Any type of detector which detects an undesirable presence may be used such as for example a motion, infrared, microwave, or sound detector. Though security and surveillance system 10 is shown having four zones of surveillance, security and surveillance system 10 may monitor any number of zones of surveillance and each zone of surveillance may have any number of detectors associated therewith. Security and surveillance system 10 also includes video cameras 20, 22, 24, and 26 for each zone of surveillance A, B, C, and D, respectively. Each zone of surveillance A, B, C, and D may also have light assemblies 28, 30, 32, and 34, respectively, associated therewith.

A television monitor 36 displays the images generated by cameras 20, 22, 24, and 26 by receiving a camera signal as determined by a camera switcher 38. Camera switcher 38 receives activation signals from detectors 12, 14, 16, and 18 and transmits an appropriate camera signal to television monitor 36 in response to an activation signal indicating that one of the detectors has determined the existence of a presence in a corresponding zone of surveillance. A processor 40 also receives activation signals from detectors 12, 14, 16, and 18 and controls television monitor 36 and light assemblies 28, 30, 32, and 34.

In operation, detectors 12, 14, 16, and 18 determine the existence of an undesirable presence in zones of surveillance A, B, C, and D, respectively. A detector determining the existence of a presence, such as an intruder, generates an activation signal received by camera switcher 38. Camera switcher 38 activates one of video cameras 20, 22, 24, and 26 corresponding to the activation signal and transmits the appropriate camera signal to television monitor 36. Processor 40 receives the triggered activation signal from the triggered detector through camera switcher 38. Processor 40 controls light assemblies 28, 30, 32, and 34 corresponding to the triggered zone of surveillance and generates a timed infrared code to control television monitor 36. Processor 40 may be programmed to generate a timed infrared code that can perform any of a variety of specific functions. An example shown in FIG. 1 has processor 40 generating a timed infrared code to control television monitor 36 in order to display the image from the camera in a picture in picture window corresponding to the triggered zone of surveillance.

Figure 2:
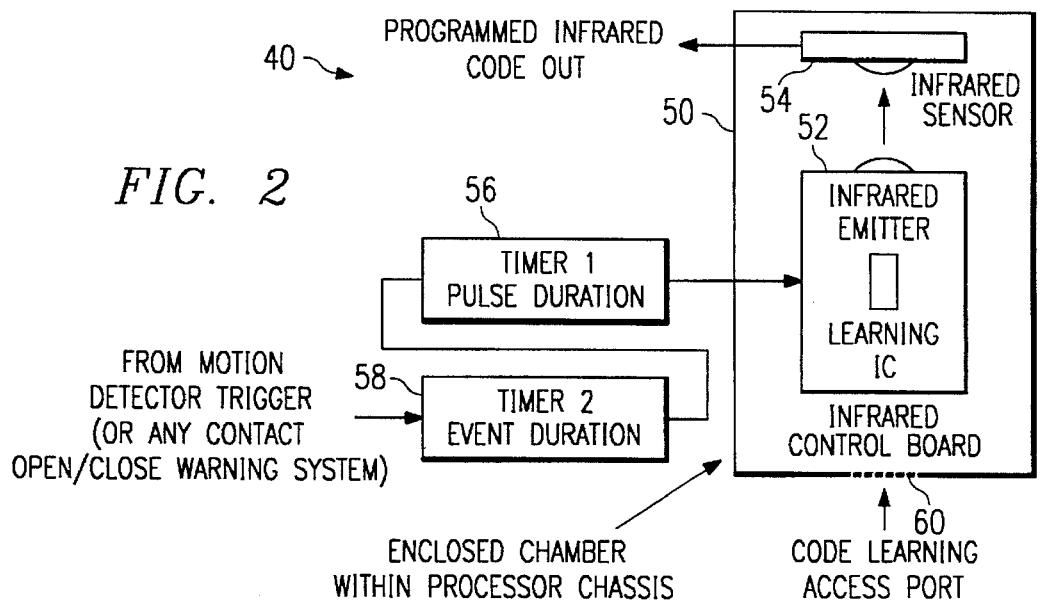
FIG. 2 illustrates a block diagram of a processor implemented in the preferred security and surveillance system.

FIG. 2 is a block diagram of processor 40. Processor 40 includes an infrared control board 50 comprising an infrared emitter 52 and an infrared sensor 54. Processor 40 also includes a pulse timer 56 and an event timer 58 connected in series to infrared emitter 52. Though not shown, processor 40 may also contain power supplies and transformers to drive detectors 12, 14, 16, and 18.

In operation, an activation signal from a detector in a triggered zone of surveillance initiates timer 58 which sends a signal to initiate timer 56, providing an input to infrared emitter 52. Infrared emitter 52, as programmed through a code learning access port 60, emits an infrared coded signal in response to the activation signal feeding through timer 58 and timer 56. Event timer 56 generates a signal for a predetermined time interval in response to the activation signal in order to drive infrared emitter 52. Event timer 58 prevents repeated activation signals from the same detector from affecting the ability of infrared emitter 52 to generate the appropriate infrared coded signal. Infrared sensor 54 transmits the infrared coded signal from infrared emitter 52 and provides the infrared coded signal to a secondary emitter 62 of FIG. 1 for controlling television monitor 36. Though infrared emitter 52 can control television monitor 36 alone, infrared sensor 54 and secondary emitter 62 provide for infrared coded signal transmission when processor 40 and television monitor 36 cannot be placed within operable vicinity of each other.

Figure 3:
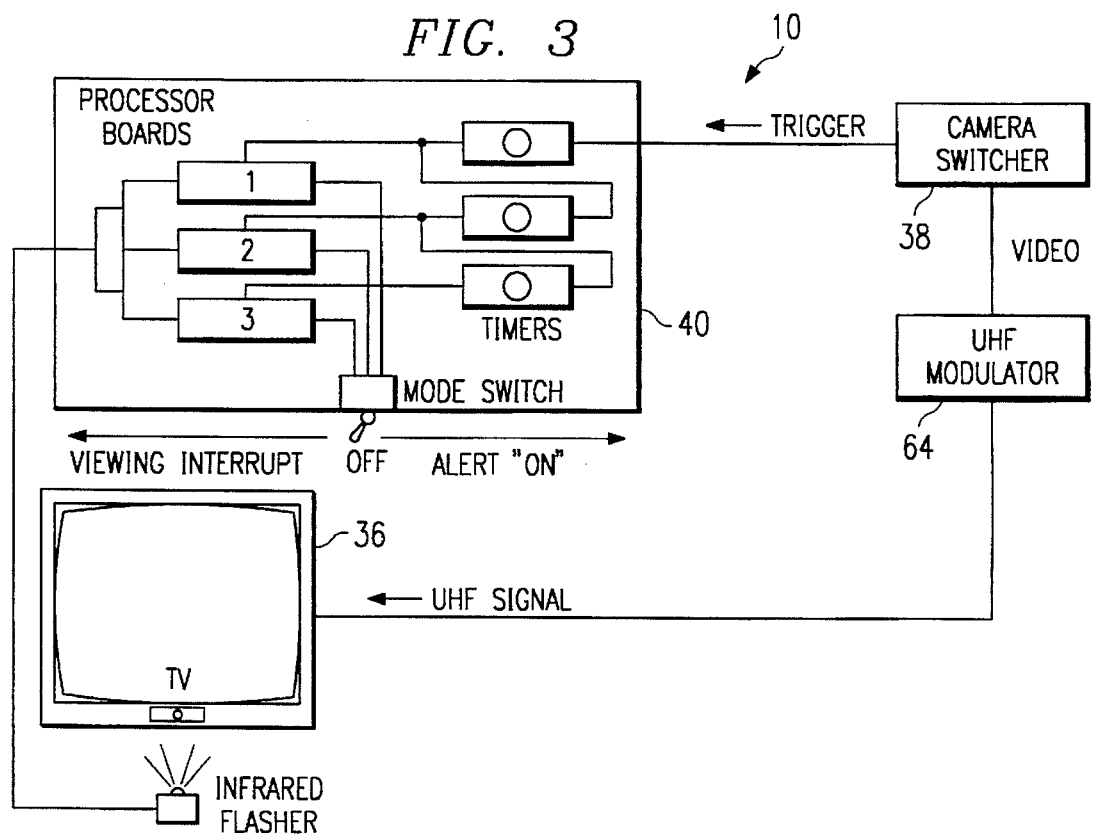
FIG. 3 illustrates a block diagram of a security and surveillance system wherein the processor performs another specified function.

FIG. 3 is a block diagram of another application of security and surveillance system 10. In this application, processor 40 can operate in one of three different modes. In the off mode, processor 40 does not generate an infrared code and thus security and surveillance system 10 does not display an image from a video camera onto television monitor 36.

In the viewing interrupt mode, processor 40 sends commands to television monitor 36 upon the detection of an intrusion event that will interrupt the normal viewing of entertainment programs on television monitor 36 by displaying the image generated by the camera in the triggered zone of surveillance. An example of a viewing interrupt is shown in FIG. 1 where processor 40 commands television monitor 36 to display the image from the triggered zone of surveillance on a picture in picture window.

The application of FIG. 3 shows how television monitor 36 can display the image from a triggered zone of surveillance without having picture in picture capability. The camera signal from camera switcher 38 is fed through a UHF modulator 64 before being sent to television monitor 36. UHF modulator 64 converts the camera signal from camera switcher 38 into a UHF signal that can be displayed on television monitor 36 over a selected UHF channel. During viewing interrupt mode, processor 40 commands television monitor 36 to proceed to the appropriate UHF channel for display of the image of the triggered zone of surveillance.

Boards 1, 2, and 3 within processor 40 generate separate infrared coded signals to control television monitor 36. During viewing interrupt mode, board 1 sends the infrared coded signal for the first digit of the UHF channel, board 2 sends the infrared coded signal for the second digit of the UHF channel, and board 3 is inactive. In this manner, processor 40 commands television monitor 36 to proceed to the predetermined UHF channel for displaying of the triggered zone of surveillance. Though each board is shown as generating a separate infrared coded signal, processor 40 may include boards that generate multiple infrared coded signals as desired. Further, these boards may generate infrared coded signals which perform specific functions different than those shown in the examples of FIG. 3.

During non-viewing periods, processor 40 may be placed in an alert mode. In the event of an intrusion event during alert mode, processor 40 commands television monitor 36 to power on and subsequently display the image from the triggered zone of surveillance on an appropriate UHF channel or picture in picture window. For the specific application shown, board 1 generates an "on" infrared coded signal, board 2 generates an infrared coded signal for the first UHF channel digit, and board 3 generates an infrared coded signal for the second UHF channel digit. As another example of a specific function, processor 40 may also adjust the sound level of television monitor 36 to provide an audio alert in the event of an intruder detection.

Camera switcher 38 may be programmed to transmit selected images to television monitor 36. In the event two or more detectors generate activation signals, camera switcher 38 can transmit images serially through timed intervals. Camera switcher 38 may also transmit a plurality of images simultaneously in a multiple display format such as split screen or quad screen. In this manner, security and surveillance device 10 can provide efficient monitoring of the zones of surveillance.

FIG. 4 shows an alternative application of the security and surveillance system 10 of FIG. 1. A recording device 70, such as a videocassette recorder, may be coupled to television monitor 36 and the camera signal from camera switcher 38. Recording device 70 provides recording of images from cameras 20, 22, 24, and 26 for later playback in lieu of real time monitoring on television monitor 36. Recording device 70 may also record images displayed by television monitor 36. Recording device 70 may be controlled by a secondary emitter 72 in a similar manner as secondary emitter 62 controls television monitor 36.

A recording device 70 may be used in the embodiment of FIG. 3. Processor 40 may have a fourth mode that implements recording device 70. In a record mode, processor 40 commands recording device 70 through secondary emitter 72 to activate and record images from a triggered zone of surveillance. The record mode may be included with the alert mode of processor 40 previously described.

In summary, a security and surveillance system uses a processor to generate an infrared code in order to perform a specific function. The processor receives an activation signal from a detector monitoring his own surveillance. Processor 40 may be programmed to generate infrared codes corresponding to the activation signal for performing a variety of different functions. This specific application has the processor generating infrared codes to control a television monitor which can display images generated by video cameras located at each zone of surveillance. Processor 40 may be programmed to interrupt normal viewing operation of the television monitor or energize the television monitor to provide an alert warning during non viewing periods.

Thus, it is apparent that there has been provided, in accordance with the present invention, a security and surveillance system that satisfies the advantages set forth above. Although the preferred embodiment has been described in detail, it should be understood that various changes, substitutions, and alterations can be made herein. For example, though the processor is shown to control a television monitor in the preferred embodiment, the processor may generate infrared codes which can control devices other than a television monitor such as a localized alarm. Other examples are readily ascertainable by one skilled in the art and could be made without departing from the spirit and scope of the present invention as defined by the following claims.

What is claimed is:

1. A security and surveillance system, comprising:
   a detector for determining a presence in a zone of surveillance, said detector generating an activation signal in response to said presence;
   a processor for generating an infrared code to perform a specific function in response to said activation signal from said detector;
   a video camera for generating an image of said zone; and
   a recording device coupled to said video camera, said infrared code controlling said recording device to perform said specific function to include recording said image from said video camera, said processor capable of being programmed to generate said infrared code in order to operate any brand of said recording device.

2. The security and surveillance system of claim 1, further comprising:
   a plurality of detectors for determining a presence in a plurality of surveillance zones, each detector monitoring a separate surveillance zone;
   a plurality of video cameras for generating images from said plurality of surveillance zones, each video camera associated to with a separate surveillance zone; and
   a camera switcher for controlling said images to said recording device, said specific function including controlling said recording device to record said images from said video cameras.

3. The security and surveillance system of claim 2, wherein said specific function includes simultaneously recording images from said plurality of video cameras on said recording device.

4. The security and surveillance system of claim 1, wherein said processor includes a timer for controlling an interval of said specific function.

5. The security and surveillance system of claim 1, wherein said processor includes an infrared emitter for generating said infrared code corresponding to said activation signal.

6. The security and surveillance system of claim 5, wherein said processor includes an infrared sensor for receiving said infrared code from said infrared emitter.

7. The security and surveillance system of claim 1, further comprising:
   an infrared flasher for transmitting said infrared code to perform said specific function.

8. The security and surveillance system of claim 1, wherein said processor is programmable to generate different infrared codes corresponding to different specific functions.

9. The security and surveillance system of claim 7, wherein the specific function includes turning on said recording device.

10. A device for monitoring a plurality of zones of surveillance, comprising:
    a separate detector corresponding to each zone of surveillance for detecting an undesirable presence, each detector generating an activation signal in response to said undesirable presence;
    a separate video camera corresponding to each zone of surveillance for generating images of each zone of surveillance;
    a camera switcher for transmitting selected images from said plurality of video cameras;
    a television monitor for displaying said selected images from said camera switcher;
    a recording device for recording said selected images from said camera switcher; and
    a processor for generating an infrared coded signal in response to said activation signal in order to perform specific function for controlling said television monitor and said recording device.

11. The device of claim 10, wherein said processor is programmable to generate different infrared coded signals for performing different specific functions that control said television monitor and said recording device such that said processor can interrupt normal viewing behavior or activate said television monitor for displaying or said recording device for recording an appropriate image of a triggered zone of surveillance.

12. The device of claim 10, further comprising:
    a separate light assembly corresponding to each zone of surveillance, said processor controlling said light assembly to adjust an amount of light within a zone of surveillance.

13. The device of claim 10, wherein said specific function is to display selected images on a picture in picture window of said television monitor.

14. The device of claim 10, wherein said specific function is to record images displayed on said television monitor by said recording device.

15. The device of claim 10, further comprising:
    a UHF modulator for converting said selected signals into a UHF signal, wherein said specific function is to display said selected images on a predetermined UHF channel of said television monitor.

16. The device of claim 10, wherein said processor operates in a first, second, third mode, and fourth mode, said first mode disables said processor, said second mode interrupts television viewing upon detection of said undesirable presence, said third mode activates said television monitor during non-viewing periods to display said selected images upon detection of said undesirable presence, and said fourth mode activates said recording device to record images from said camera switcher or said television monitor.

17. The security and surveillance system of claim 10, wherein the specific function includes turning on said recording device.

18. The security and surveillance system of claim 10, wherein said specific function includes simultaneously displaying images from said plurality of video cameras on said recording device.

19. A method of surveillance, comprising the steps of:
    monitoring a zone of surveillance to detect an existence of an undesirable presence;
    generating an infrared coded signal in response to said undesirable presence;
    performing a specific function in response to said infrared coded signal; and
    generating an image of said zone of surveillance, wherein said specific function is to control a recording device in order to record said image.

20. The method of claim 19, wherein a plurality of zones of surveillance are monitored and a plurality of images are generated corresponding to each zone of surveillance, wherein said images are selected for recording by said recording device.

* * * * *

(12) EX PARTE REEXAMINATION CERTIFICATE (9323rd)
United States Patent
Tapp

(10) Number: US 5,657,076 C1
(45) Certificate Issued: Oct. 3, 2012

(54) SECURITY AND SURVEILLANCE SYSTEM

(76) Inventor: Hollis M. Tapp, Mesquite, TX (US)

Reexamination Request:
No. 90/010,848, Mar. 4, 2010

Reexamination Certificate for:
Patent No.: 5,657,076
Issued: Aug. 12, 1997
Appl. No.: 08/404,114
Filed: Mar. 14, 1995

Related U.S. Application Data

(63) Continuation-in-part of application No. 08/003,420, filed on Jan. 12, 1993, now Pat. No. 5,398,057.

(51) Int. Cl.
*G08B 15/00* (2006.01)
*H04N 7/18* (2006.01)

(52) U.S. Cl. ............... 348/154; 348/565; 348/E7.086

(58) Field of Classification Search .......... None
See application file for complete search history.

(56) References Cited

To view the complete listing of prior art documents cited during the proceeding for Reexamination Control Number 90/010,848, please refer to the USPTO's public Patent Application Information Retrieval (PAIR) system under the Display References tab.

*Primary Examiner* — C. Michelle Tarae

(57) ABSTRACT

A security and surveillance system (10) uses a processor (40) to generate an infrared coded signal for performing a specific function. A detector (12) monitors a zone of surveillance (A) and generates an activation signal in response to the detection of an intruder in the zone. The activation signal triggers the processor (40) to generate an infrared coded signal to perform a specific function corresponding to the triggered zone of surveillance (A). In a specific application, a camera switcher (38) transmits an appropriate camera signal to a television monitor (36) and infrared coded signals generated by the processor (40) control and command the television monitor (36) to display the images from the video camera (20) in response to an intruder detection.

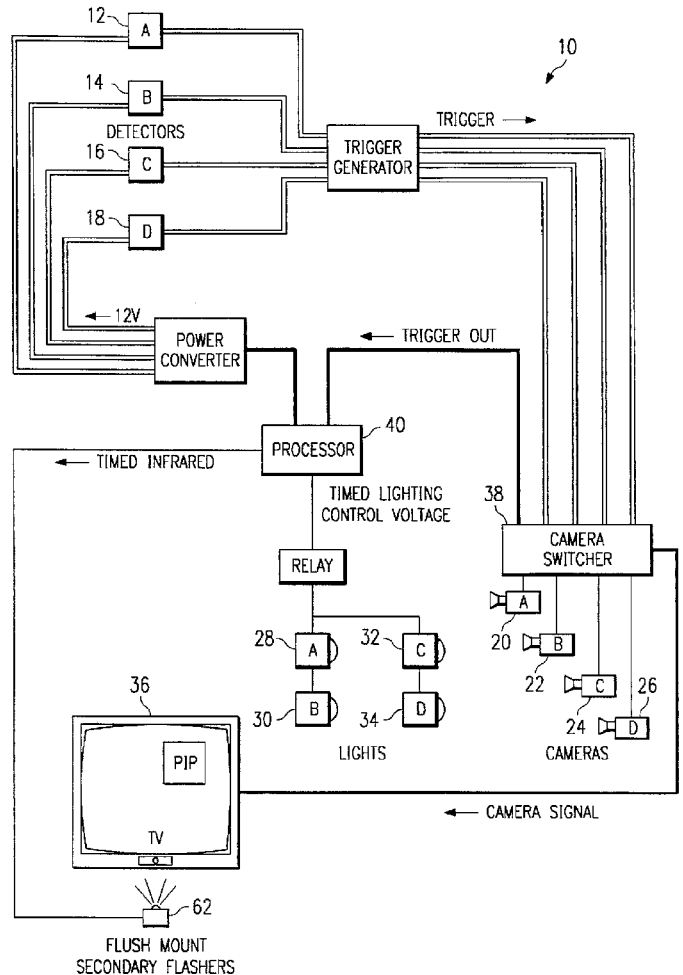

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 16 and 18 is confirmed.

Claims 1-15, 17, 19 and 20 are cancelled.

\* \* \* \* \*